US012091888B2

(12) United States Patent
Mei et al.

(10) Patent No.: US 12,091,888 B2
(45) Date of Patent: Sep. 17, 2024

(54) ANTI-COUNTERFEITING ASSEMBLY AND PACKING BOX HAVING THE SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Zhen-Hai Mei, Zhengzhou (CN); Fu-Pin Hsieh, New Taipei (TW); Hong Liu, Zhengzhou (CN); Fa-Peng Sun, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 452 days.

(21) Appl. No.: 17/585,848

(22) Filed: Jan. 27, 2022

(65) Prior Publication Data
US 2022/0242158 A1    Aug. 4, 2022

(30) Foreign Application Priority Data
Feb. 3, 2021   (CN) .......................... 202120315177.6

(51) Int. Cl.
*G06F 21/86*    (2013.01)
*B65D 55/02*    (2006.01)
*E05B 73/00*    (2006.01)

(52) U.S. Cl.
CPC ........ *E05B 73/0023* (2013.01); *B65D 55/028* (2013.01); *G06F 21/86* (2013.01); *B65D 2203/12* (2013.01); *B65D 2401/00* (2020.05)

(58) Field of Classification Search
CPC ............... B65D 55/026; B65D 55/028; B65D 2203/12; B65D 2401/00; G08B 21/18; B42D 25/30; G06F 21/86; E05B 73/0023
USPC ......................... 340/568.1, 571, 572.1, 572.8
See application file for complete search history.

(56) References Cited

U.S. PATENT DOCUMENTS

| | | | |
|---|---|---|---|
| 11,463,245 B2 * | 10/2022 | Adari | G16Y 30/10 |
| 2022/0411148 A1 * | 12/2022 | Rajagopal | B65D 55/145 |
| 2023/0008277 A1 * | 1/2023 | Gloor | B65D 51/002 |

* cited by examiner

Primary Examiner — Mollie Impink
(74) Attorney, Agent, or Firm — ScienBiziP, P.C.

(57) ABSTRACT

An anti-counterfeiting assembly includes a fixing member, a first connecting member, a second connecting member, an anti-counterfeiting member and a cover. The first connecting member fixed to the fixing member, the first connecting member defining a first receiving groove. The second connecting member movably connected to the first connecting member, the first connecting member is arranged between the fixing member and the second connecting member, the second connecting member defining a second receiving groove communicating with the first receiving groove. The anti-counterfeiting member includes an electronic screen and a battery arranged on the electronic screen, the battery disposed in the first receiving groove, the electronic screen disposed in the second receiving groove. The cover wrapping the first connecting member and the second connecting member, the second connecting member is adapted to move along a first direction away from the fixing member.

18 Claims, 7 Drawing Sheets

ANTI-COUNTERFEITING ASSEMBLY AND PACKING BOX HAVING THE SAME

FIELD

The subject matter herein generally relates to security of property, and more particularly, to an anti-counterfeiting assembly and a packing box having the anti-counterfeiting assembly.

BACKGROUND

High-end products, such as red wine, tea, traditional Chinese medicine, or jewelry, is packaged in boxes. Such a box includes a lower cover and an upper cover that can be connect together to enclose and protect the product. An anti-counterfeiting label can be fixed across the joining surface between the upper and the lower covers, which can guard against tampering or replacement of the product inside of the box, and authenticity of the product can be confirmed by the anti-counterfeiting label being intact before opening the box.

However, the anti-counterfeiting label can be easily to be torn off from the box, and then the authentic product in the packing box might be replaced with fake product. Furthermore, a verification code on the anti-counterfeiting label is in plain sight and can be easily copied.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
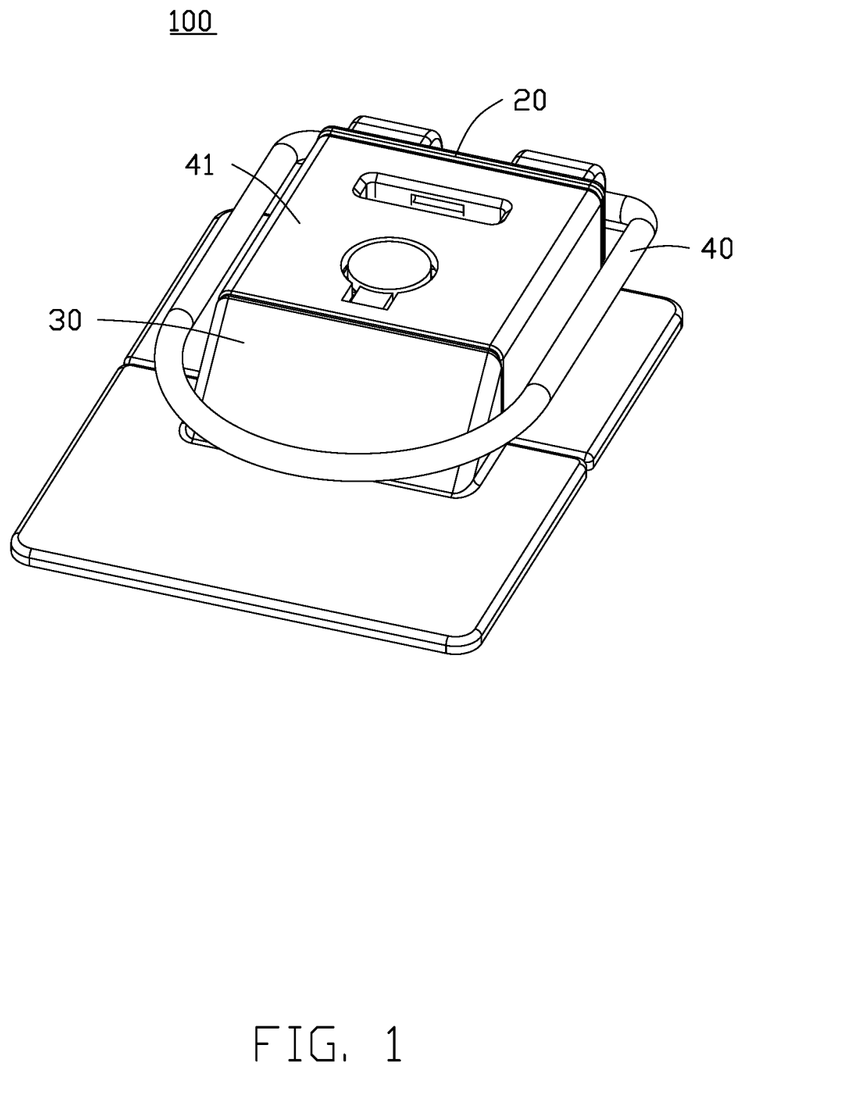
FIG. 1 is a diagrammatic view of an anti-counterfeiting assembly according to an embodiment of the present disclosure.
Figure 2:
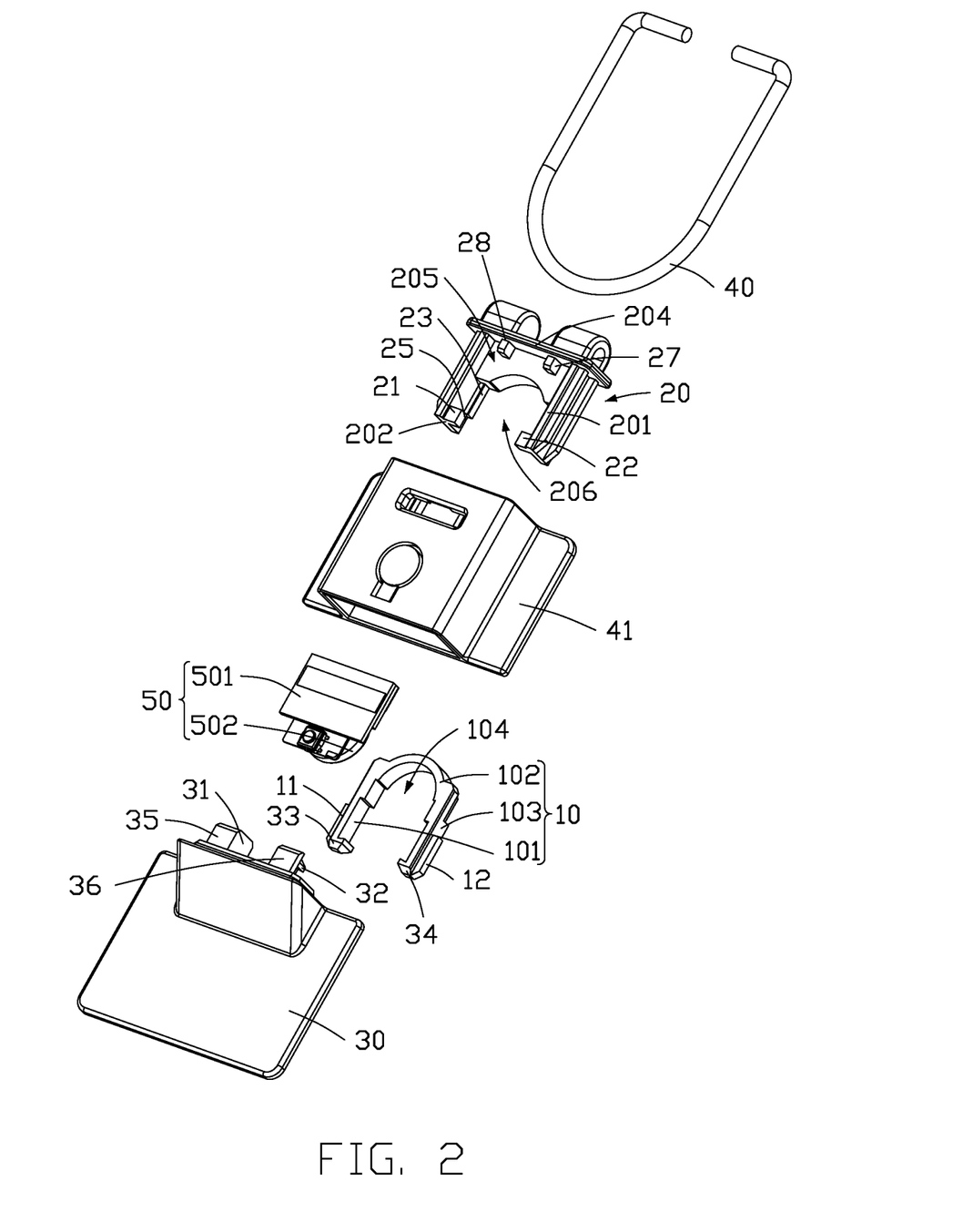
FIG. 2 is an exploded view of the anti-counterfeiting assembly of FIG. 1.

Referring to FIGS. 1 and 2, an embodiment of an anti-counterfeiting assembly 100 is provided, which includes a first connecting member 10, a second connecting member 20, a fixing member 30, an anti-counterfeiting member 50, and a cover 41. The first connecting member 10 is arranged between the second connecting member 20 and the fixing member 30. The first connecting member 10 is movably connected to the second connecting member 20. The first connecting member 10 is fixed to the fixing member 30. The first connecting member 10 and the second connecting member 20 are received in the cover 41. The anti-counterfeiting member 50 is arranged in the first connecting member 10 and the second connecting member 20.

Referring to FIGS. 1 and 2, in order to protect the anti-counterfeiting member 50, the anti-counterfeiting member 50 is also received in the packaging cover 41. The connecting portion between the first connecting member 10 and the fixing member 30 is also received in the packaging cover 41. Both ends of the cover 41 are open ends, so that the second connecting member 20 can separate from the anti-counterfeiting assembly 100 along a direction away from the fixing member 30.

Figure 3:
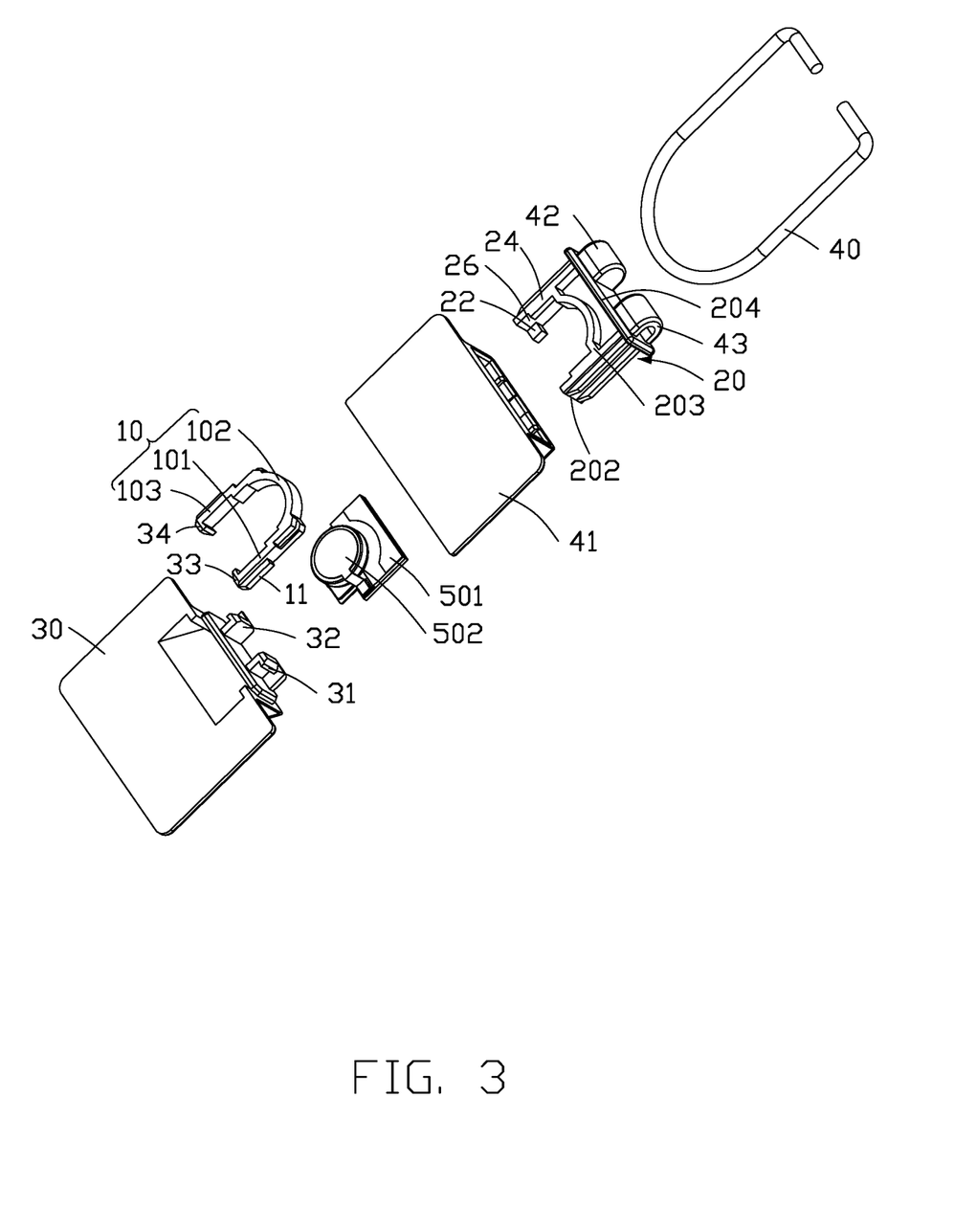
FIG. 3 is similar to FIG. 2, but showing the anti-counterfeiting assembly from another angle.

Referring to FIGS. 2 and 3, the second connecting member 20 is provided with an operating member 40 at an end portion away from the fixing member 30. When the operating member 40 is pulled, the operating member 40 drives the second connecting member 20 to move, so as to separate the second connecting member 20 from the first connecting member 10. In one embodiment, the second connecting member 20 is also provided with a first connecting ring 42 and a second connecting ring 43 at the end away from the fixing member 30. A central axis of the first connecting ring 42 is aligned with a central axis of the second connecting ring 43. The operating member 40 can be a pulling ring. In other embodiments, the operating member 40 can also be a pulling hook, a pulling rod, or a pulling rope. Both ends of the pull ring are rotatably connected to the first connecting ring 42 and the second connecting ring 43.

Figure 4:
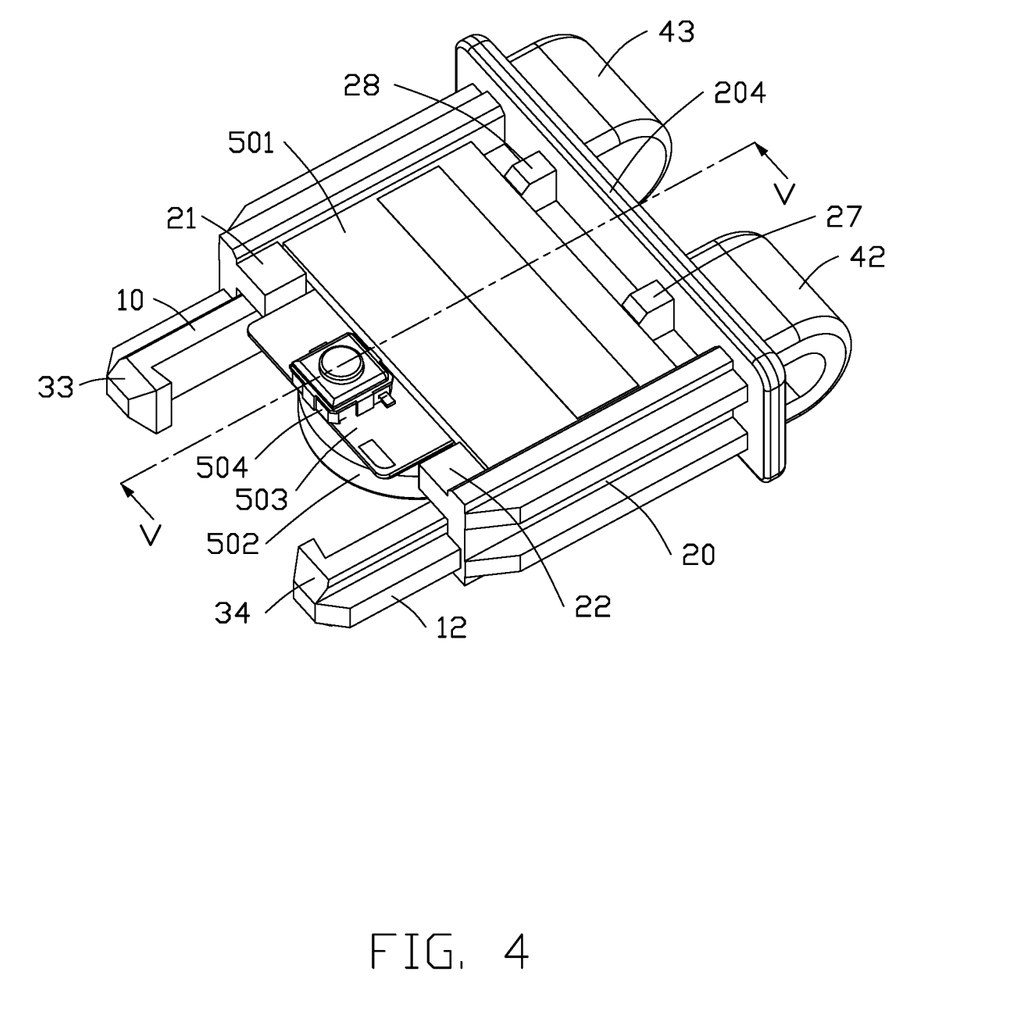
FIG. 4 is a diagrammatic view of the anti-counterfeiting assembly of FIG. 1, with a cover of the anti-counterfeiting assembly removed.
Figure 5:
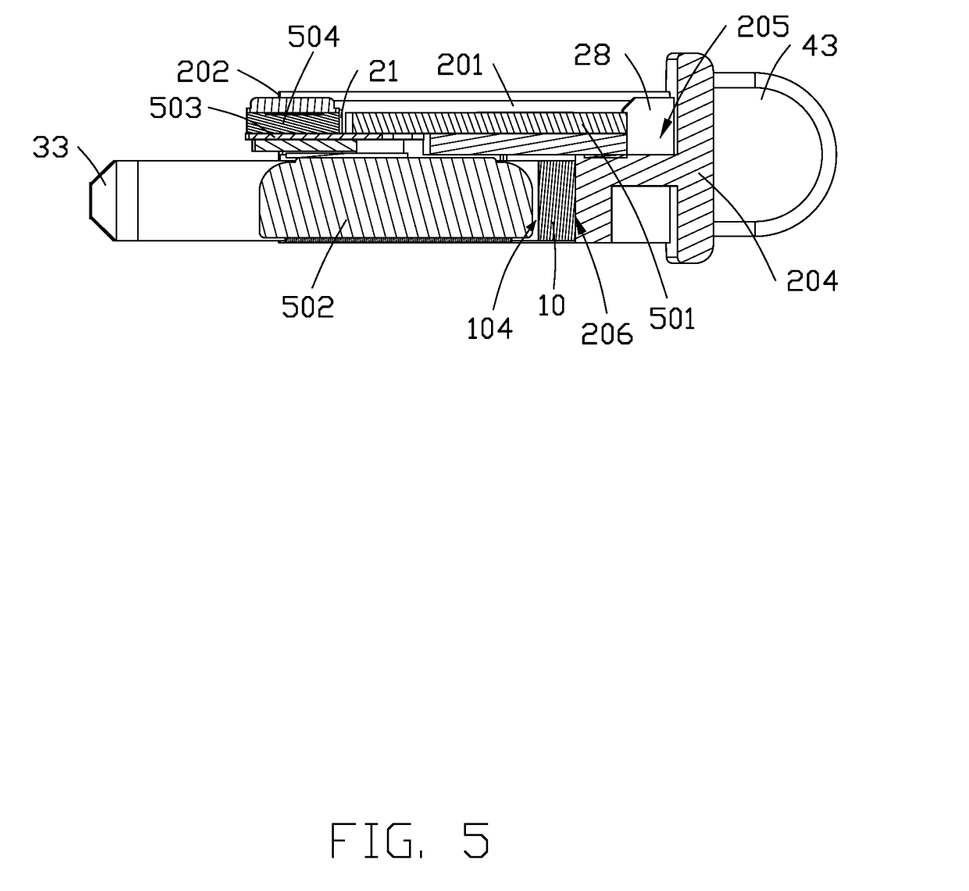
FIG. 5 is a cross-sectional view along V-V of FIG. 4.

Referring to FIG. 2, the anti-counterfeiting member 50 includes an electronic screen 501 and a battery 502, and the battery 502 is arranged on a surface of the electronic screen 501. The electronic screen 501 is provided with an electronic anti-counterfeiting label (not shown) for displaying an identification information of the product. A user can distinguish the authenticity of the product by the identification information. The electronic screen 501 is electrically connected with the battery 502, such as by spot welding for example. In this embodiment, the battery 502 is a button battery. Referring to FIGS. 4 and 5, the anti-counterfeiting member 50 also includes a circuit board 503 and a switch 504. The circuit board 503 is arranged between the electronic screen 501 and the battery 502, and the circuit board 503 stores the identification information. The electronic screen 501 is connected to the battery 502 through the circuit board 503. In other embodiments, the circuit board 503 can also be integrated on the electronic screen 501. The circuit board 503 partially protrudes from the electronic screen 501 towards the fixing member 30. When the anti-counterfeiting member 50 is damaged by an external force, the anti-counterfeiting information in the circuit board 503 is erased. Even if the anti-counterfeiting member 50 is reused, the anti-counterfeiting information cannot be recovered, that is, the anti-counterfeiting member 50 cannot be reused.

The switch 504 is arranged on the circuit board 503, and the switch 504 and the electronic screen 501 are located on the same surface of the circuit board 503. The switch 504 is used to connect the battery 502 or to disconnect the battery 502 from the electronic screen 501. Thus, the electric energy of the battery 502 can be saved. When the switch 504 connects the electronic screen 501 to the battery 502, the anti-counterfeiting label displays the identification information on the electronic screen 501. In other embodiments, the switch 504 can also be omitted.

Referring to FIGS. 2 and 3, the first connecting member 10 includes a first connecting block 101, a second connecting block 102, and a third connecting block 103 The second connecting block 102 is connected between the first connecting block 101 and the third connecting block 103. The first connecting block 101, the second connecting block 102, and the third connecting block 103 are enclosed to form a first receiving groove 104 of U-shaped. The battery 502 is received in the first receiving groove 104. In this embodiment, inner surfaces of the second connecting block 102 towards the first connecting block 101 and the third connecting block 103 are arc to match the shape of the battery 502. In other embodiments, the shape of the inner surface of the second connecting block 102 can be changed according to the shape of the battery 502.

Figure 6:
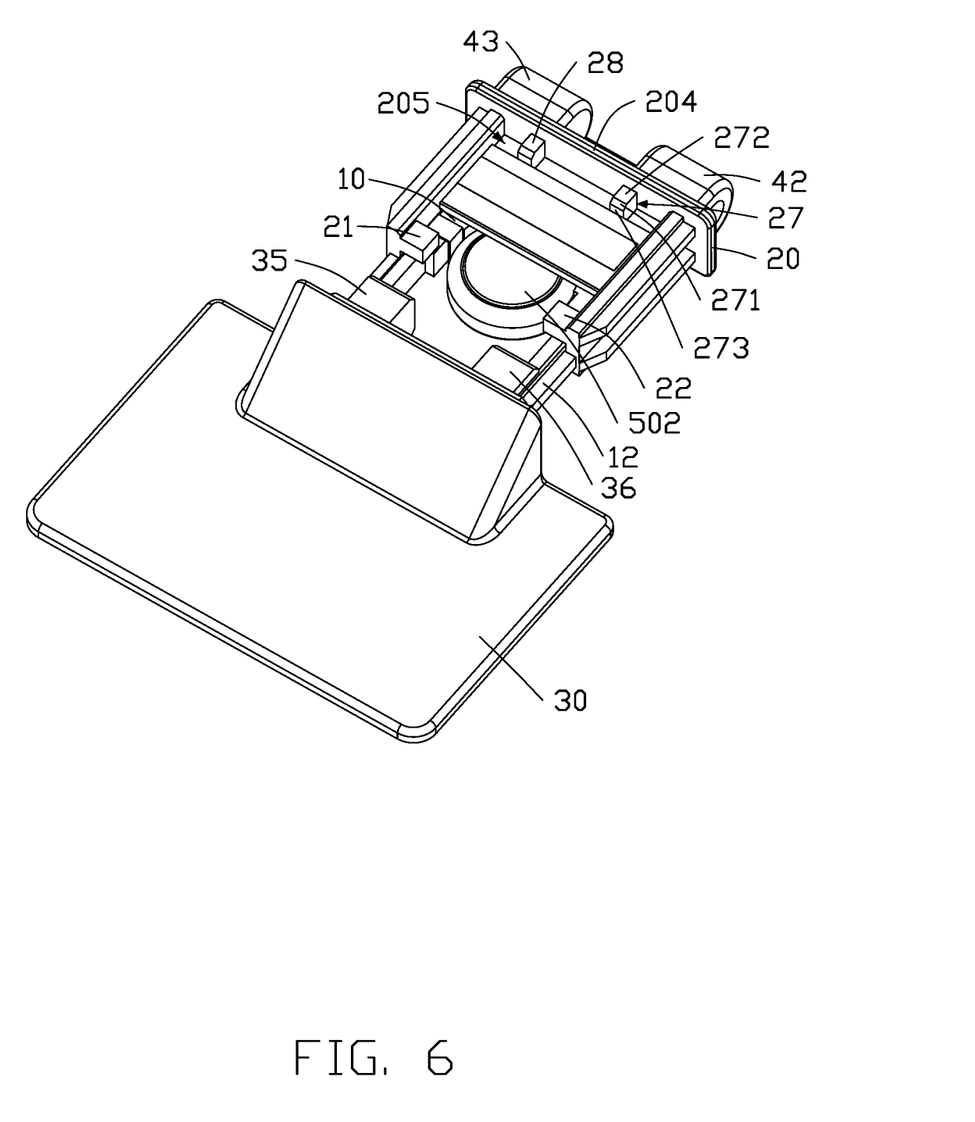
FIG. 6 is a diagrammatic view of the anti-counterfeiting assembly of FIG. 1, when a battery is disposed to a first connecting member of the anti-counterfeiting assembly.

Referring to FIGS. 2 and 3, the second connecting member 20 has a first surface 201 and a second surface 202 adjacent to the first surface 201, a third surface 203 opposite to the first surface 201, and a fourth surface 204 opposite to the second surface 202. The second surface 202 faces the fixing member 30. Referring to FIGS. 5 and 6, the first surface 201 is recessed toward the third surface 203 to form a second receiving groove 205. The electronic screen 501 is received in the second receiving groove 205. The second connecting member 20 is provided with a first clamping block 21 and a second clamping block 22 on two opposite inner walls of the second receiving groove 205. The first clamping block 21 and the second clamping block 22 are arranged close to the second surface 202. The first clamping block 21 and the second clamping block 22 are arranged on a side of the electronic screen 501 facing the fixing member 30.

Referring to FIGS. 2 and 3, the second surface 202 is recessed toward the fourth surface 204 to form a third receiving groove 206. Referring to FIGS. 4 and 5, the third receiving groove 206 penetrates the bottom of the second receiving groove 205 and the third surface 203. The second connecting block 102, a part of the first connecting block 101, and a part of the third connecting block 103 are accommodated in the third receiving groove 206. The second connecting member 20 is provided with a third clamping block 23 and a fourth clamping block 24 on inner walls of the third receiving groove 206. The first clamping block 21 and the third clamping block 23 are located on the same side of the inner wall of the second connecting member 20. Along a direction from the first surface 201 to the third surface 203, a first gap 25 is formed between the first clamping block 21 and the third clamping block 23, and the first connecting block 101 is partially placed in the first gap 25. When the first connecting block 101 of the first connecting member 10 is inserted into the first gap 25, the first clamping block 21 and the third clamping block 23 are placed on the opposite sides of the first connecting block 101, thereby limiting the position of the first connecting block 101 in the second connecting member 20.

The second clamping block 22 and the fourth clamping block 24 are also located on the same side of the inner wall of the second connecting member 20. A second gap 26 is formed between the second clamping block 22 and the fourth clamping block 24 along the direction from the first surface 201 to the third surface 203. The third connecting block 103 is partially placed in the second gap 26, so that the second clamping block 22 and the fourth clamping block 24 are placed on the opposite sides of the third connecting block 103. Since the first connecting block 101 and the third connecting block 103 are inserted into the first gap 25 and the second gap 26 respectively, the connection between the first connecting member 10 and the second connecting member 20 is stable.

Referring to FIGS. 2 and 3, when the second connecting member 20 moves along the direction of the first connecting member 10 away from the fixed member 30, the first clamping block 21 and the second clamping block 22 move along with the second connecting member 20 and drive the electronic screen 501 to move. The first connecting member 10 and the battery 502 are fixed on the fixed member 30. The second connecting member 20 and the electronic screen 501 move away from the fixed member 30, so that the electronic screen 501 is separated from the battery 502, and the anti-counterfeiting member 50 is damaged and cannot be reused.

Referring to FIGS. 2 and 3, the surface of the first connecting block 101 away from the third connecting block 103 is provided with a first bump 11. The surface of the third connecting block 103 away from the first connecting block 101 is provided with a second bump 12. A length of the first bump 11 is less than a length of the first connecting block 101, and a length of the second bump 12 is less than a length of the third connecting block 103. Wherein, the above length is defined as a dimension along the direction of the first connecting member 10 away from the fixing member 30. The ends of the first bump 11 and the second bump 12 away from the fixed member 30 are abutted against on the second surface 202, so as to limit the length of the first connecting member 10 extending into the second connecting member 20 through the first gap 25 and the second gap 26. Thus, the connection position between the first connecting member 10 and the second connecting member 20 can be easily determined.

Referring to FIGS. 2 and 3, the fixing member 30 includes a first snap 31 and a second snap 32 close to the first connecting member 10. The end portion of the first connecting block 101 away from the second connecting block 102 is provided with a third snap 33 connected with the first snap 31, and the end portion of the third connecting block 103 away from the second connecting block 102 is provided with a fourth snap 34 connected with the second snap 32. The first connecting member 10 and the fixing member 30 are fixed together through the connection of the first snap 31 and the third snap 33, and the connection of the second snap 32 and the fourth snap 34.

Referring to FIGS. 2 and 6, in order to further improve the security of the anti-counterfeiting assembly 100, the fixing member 30 is provided with a first baffle 35 on the first snap 31. The first baffle 35 is used to cover the connection portion between the first snap 31 and the third snap 33. The first baffle 35 and the electronic screen 501 are located on the same side of the second connecting member 20. Similarly, the fixing member 30 is provided with a second baffle 36 on the second snap 32. The second baffle 36 is used to cover the connection portion between the second snap 32 and the fourth snap 34. The second baffle 36 and the first baffle 35 are on the same side of the fixing member 30. As such, the connection portion between the first snap 31 and the third snap 33, and the connection portion of the second snap 32 and the fourth snap 34 are prevented from being damaged under the external force, so that the separation of the first connecting member 10 from the fixing member 30 is avoided.

Referring to FIGS. 4, 5 and 6, the second connecting member 20 is provided with a first positioning block 27 and a second positioning block 28 on the inner wall of the second receiving groove 205. The first positioning block 27 and the second positioning block 28 are located on the same side of the inner wall of the second receiving groove 205, and are spaced apart from each other. The first positioning block 27 has a top face 272 opposite to the bottom of the second receiving groove 205, a side face 273 connected to the bottom of the second receiving groove 205, and an inclined face 271 connected between the top surface 272 and the side 273. The included angle between the inclined face 271 and the bottom of the second receiving groove 205 is an acute angle. As such, when installing the electronic screen 501, the inclined face 271 of the first positioning block 27 can provide a guiding function on the electronic screen 501. At the same time, the distance between the first positioning block 27 and the second positioning block 28 facilitates the installation of the electronic screen 501.

Figure 7:
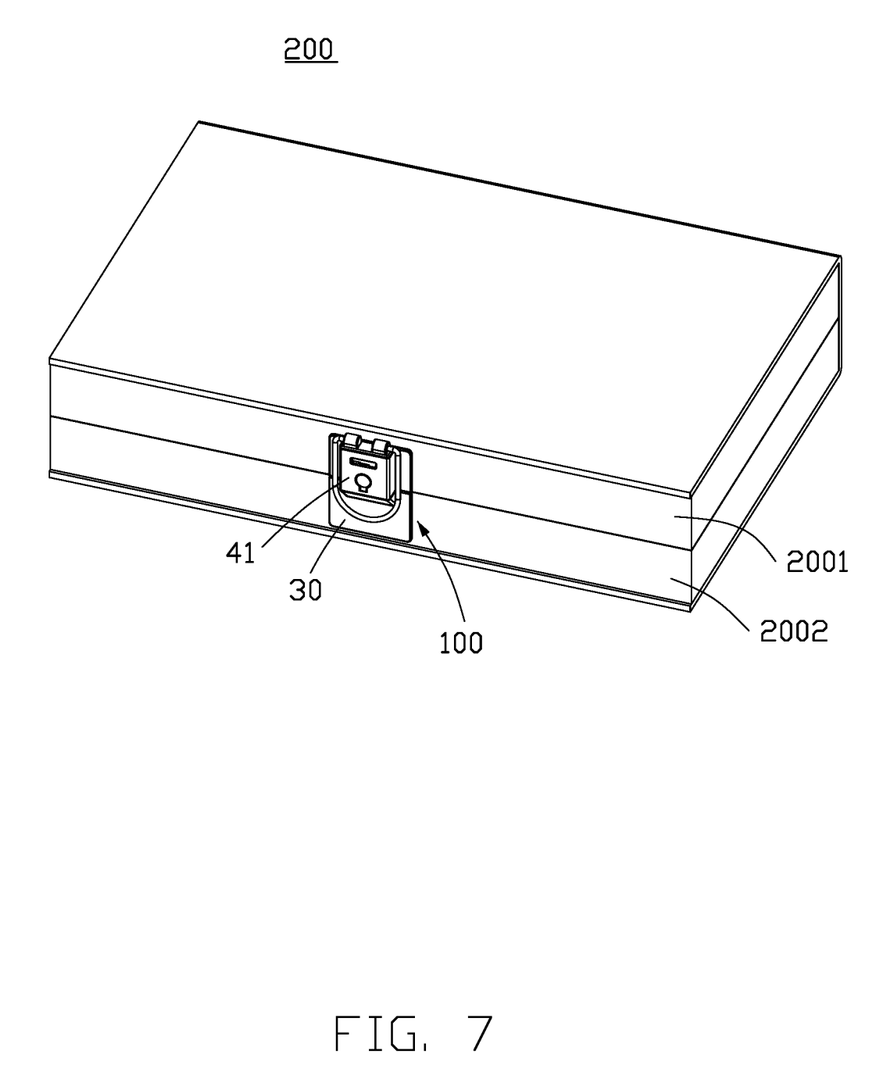
FIG. 7. is a diagrammatic view of a packing box with anti-counterfeiting assembly of FIG. 1 according to an embodiment of the present disclosure.

Referring to FIG. 7, the anti-counterfeiting assembly 100 can be applied to a packing box 200, such as red wine box, tea box, traditional Chinese medicine box, or jewelry box. In the present embodiment, the anti-counterfeiting assembly 100 is fixed to the packing box 200 by glue. The packing box 200 includes a box body, which includes a first cover 2001 and a second cover 2002 connecting the first cover 2001. Specifically, the anti-counterfeiting assembly 100 is fixed at the connection portion between the first cover 2001 and the second cover 2002. The cover 41 is fixed to the first cover 2001, and the fixing member 30 is fixed to the second cover 2002.

Since the first connecting member 10 and the fixing member 30 are fixed together, the packing box 200 can only be opened by separating the first connecting member 10 from the second connecting member 20. After the separation, the first connecting member 10, the fixing member 30, and the battery 502 are attached to the second cover 2002 of the packing box 200, and the second connecting member 20 drives the electronic screen 501 to be pulled out of the packaging cover 41. At this time, the first cover 2001 and the second cover 2002 of the packing box 200 are separated from each other, and the packing box 200 is opened.

The packing box 200 can also be provided with more than one anti-counterfeiting assembly 100 according to requirements.

In the present application, because the first clamping block 21 and the second clamping block 22 limit the separation of the electronic screen 501 from the second receiving groove 205, the first receiving groove 104 limits the separation of the battery 502 from the first connecting member 10. When the second connecting member 20 is pulled along the direction of the first connecting member 10 away from the fixed member 30 to separate the first connecting member 10 and the second connecting member 20, the second connecting member 20 and the electronic screen 501 are simultaneously separated from the first connecting member 10 and the battery 502. The electronic screen 501 is separated from the battery 502, thus the anti-counterfeiting member 50 is damaged and cannot be used again.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An anti-counterfeiting assembly comprising:
    a fixing member;
    a first connecting member fixed to the fixing member, the first connecting member defining a first receiving groove;
    a second connecting member movably connected to the first connecting member, the first connecting member being arranged between the fixing member and the second connecting member, the second connecting member defining a second receiving groove communicating with the first receiving groove;
    an anti-counterfeiting member comprising an electronic screen and a battery arranged on the electronic screen and disposed in the first receiving groove, the electronic screen being disposed in the second receiving groove; and
    a cover wrapping the first connecting member and the second connecting member;
    wherein the second connecting member is adapted to move along a first direction away from the fixing member, thereby driving the electronic screen to move along the first direction until the electronic screen is separated from the battery.

2. The anti-counterfeiting assembly of claim 1, wherein the second connecting member comprises a first surface, a second surface adjacent to the first surface, a third surface opposite to the first surface, and a fourth surface opposite to the second surface, the second surface faces the fixing member;
    the first surface is recessed toward the third surface to form the second receiving groove, the second connecting member is provided with a first clamping block and a second clamping block on an inner wall of the second receiving groove, the first clamping block and the second clamping block are arranged near the second surface, and the first clamping block and the second clamping block are arranged on a side of the electronic screen towards the fixing member.

3. The anti-counterfeiting assembly of claim 2, wherein the second surface is recessed toward the fourth surface to form a third receiving groove, the third receiving groove penetrates a bottom of the second receiving groove and the third surface, and an end of the first connecting member away from the fixing member is disposed in the third receiving groove.

4. The anti-counterfeiting assembly of claim 3, wherein the first connecting member comprises a first connecting block, a second connecting block, and a third connecting block, the first connecting block is arranged opposite to the third connecting block, the second connecting block is arranged between the first connecting block and the third connecting block; and
    wherein a surface of the first connecting block away from the third connecting block is provided with a first bump, a surface of the third connecting block away from the first connecting block is provided with a second bump, and end portions of the first bump and the second bump are abutted against the second surface.

5. The anti-counterfeiting assembly of claim 4, wherein an inner wall of the third receiving groove comprises a third clamping block opposite to the first connecting block, the first clamping block and the third clamping block are arranged on the same side inside the second connecting member, the first clamping block and the third clamping block define a first gap along a direction from the first surface to the third surface, and a portion of the first connecting block is disposed in the first gap; and wherein the inner wall of the third receiving groove further comprises a fourth clamping block opposite to the third connecting block, the second clamping block and the fourth clamping block are arranged on the same side inside the second connecting member, the second clamping block and the fourth clamping block define a second gap along the direction of the first surface to the third surface, and a portion of the third connecting block is disposed in the second gap.

6. The anti-counterfeiting assembly of claim 4, wherein the fixing member comprises a first snap and a second snap, the first snap and the second snap are disposed near the first connecting member, an end portion of the first connecting block away from the second connecting block comprises a third snap, the third snap connects to the first snap, the end portion of the third connecting block away from the second connecting block defines a fourth snap, and the fourth snap connects to the second snap.

7. The anti-counterfeiting assembly of claim 6, wherein the first snap comprises a first baffle, the first baffle and the electronic screen are arranged on a same side of the fixing member, and the first baffle covers a connection portion between the first snap and the third snap; and wherein the second snap comprises a second baffle, the second baffle and the first baffle are arranged on a same side of the fixing member, and the second baffle covers a connection portion between the second snap and the fourth snap.

8. The anti-counterfeiting assembly of claim 1, wherein the second connecting member comprises a first positioning block and a second positioning block, the first positioning block and the second positioning block are arranged on an inner wall of the second receiving groove, the first positioning block comprises a top face opposite to a bottom of the second receiving groove, a side face connected to the bottom of the second receiving groove, and an inclined face connected between the top face and the side face, and an included angle between the inclined face and the bottom of the second receiving groove is an acute angle.

9. The anti-counterfeiting assembly of claim 1, wherein the second connecting member comprises an operating member, the operating member is arranged on an end portion of the second connecting member opposite to the fixing member.

10. A packing box, comprising:
a first cover;
a second cover movably connected to the first cover; and
An anti-counterfeiting assembly comprising:
a fixing member fixed to the second cover;
a first connecting member fixed to the fixing member, the first connecting member defining a first receiving groove;
a second connecting member movably connected to the first connecting member, the first connecting member being arranged between the fixing member and the second connecting member, the second connecting member defining a second receiving groove communicating with the first receiving groove;
an anti-counterfeiting member comprising an electronic screen and a battery arranged on the electronic screen, the battery being disposed in the first receiving groove, the electronic screen being disposed in the second receiving groove; and
a cover wrapping the first connecting member and the second connecting member;
wherein the second connecting member is adapted to move along a first direction away from the fixing member, thereby driving the electronic screen to move along the first direction, until the electronic screen is separated from the battery.

11. The packing box of claim 10, wherein the second connecting member comprises a first surface, a second surface adjacent to the first surface, a third surface opposite to the first surface, and a fourth surface opposite to the second surface, the second surface faces the fixing member; and wherein the first surface is recessed toward the third surface to form the second receiving groove, the second connecting member is provided with a first clamping block and a second clamping block on an inner wall of the second receiving groove, the first clamping block and the second clamping block are arranged near the second surface, and the first clamping block and the second clamping block are arranged on a side of the electronic screen towards the fixing member.

12. The packing box of claim 11, wherein the second surface is recessed toward the fourth surface to form a third receiving groove, the third receiving groove penetrates a bottom of the second receiving groove and the third surface, and an end of the first connecting member away from the fixing member is disposed in the third receiving groove.

13. The packing box of claim 12, wherein the first connecting member comprises a first connecting block, a second connecting block, and a third connecting block, the first connecting block is arranged opposite to the third connecting block, the second connecting block is arranged between the first connecting block and the third connecting block; and wherein a surface of the first connecting block away from the third connecting block is provided with a first bump, a surface of the third connecting block away from the first connecting block is provided with a second bump, and end portions of the first bump and the second bump are abutted against the second surface.

14. The packing box of claim 13, wherein an inner wall of the third receiving groove comprises a third clamping block opposite to the first connecting block, the first clamping block and the third clamping block are arranged on the same side inside the second connecting member, the first clamping block and the third clamping block define a first gap along a direction from the first surface to the third surface, and a portion of the first connecting block is disposed in the first gap; and wherein the inner wall of the third receiving groove further comprises a fourth clamping block opposite to the third connecting block, the second clamping block and the fourth clamping block are arranged on the same side inside the second connecting member, the second clamping block and the fourth clamping block define a second gap along the direction of the first surface to the third surface, and a portion of the third connecting block is disposed in the second gap.

15. The packing box of claim 13, wherein the fixing member comprises a first snap and a second snap, the first snap and the second snap are disposed near the first connecting member, an end portion of the first connecting block away from the second connecting block comprises a third snap, the third snap connects to the first snap, the end portion of the third connecting block away from the second connecting block defines a fourth snap, and the fourth snap connects to the second snap.

16. The packing box of claim 15, wherein the first snap comprises a first baffle, the first baffle and the electronic screen are arranged on a same side of the fixing member, and the first baffle covers a connection portion between the first snap and the third snap; and wherein the second snap comprises a second baffle, the second baffle and the first baffle are arranged on a same side of the fixing member, and the second baffle covers a connection portion between the second snap and the fourth snap.

17. The packing box of claim 10, wherein the second connecting member comprises a first positioning block and a second positioning block, the first positioning block and the second positioning block are arranged on an inner wall of the second receiving groove, the first positioning block comprises a top face opposite to a bottom of the second receiving groove, a side face connected to the bottom of the second receiving groove, and an inclined face connected between the top face and the side face, and an included angle between the inclined face and the bottom of the second receiving groove is an acute angle.

18. The packing box of claim 10, wherein the second connecting member comprises an operating member, the operating member is arranged on an end portion of the second connecting member opposite to the fixing member.

\* \* \* \* \*